United States Patent
Schobeß et al.

(10) Patent No.: US 11,072,322 B2
(45) Date of Patent: Jul. 27, 2021

(54) ENGINE CONTROL OF MOTOR VEHICLES WITH A PLURALITY OF E-MACHINES

(71) Applicant: AUDI AG, Ingolstadt (DE)

(72) Inventors: Nico Schobeß, Gaimersheim (DE); Mohamed Hammam, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 255 days.

(21) Appl. No.: 15/816,691

(22) Filed: Nov. 17, 2017

(65) Prior Publication Data

US 2018/0141537 A1 May 24, 2018

(30) Foreign Application Priority Data

Nov. 24, 2016 (DE) .................... 102016223303.3

(51) Int. Cl.
| | | |
|---|---|---|
| *B60W 20/10* | (2016.01) | |
| *B60L 15/20* | (2006.01) | |
| *B60K 1/02* | (2006.01) | |
| *B60W 10/06* | (2006.01) | |
| *B60W 10/08* | (2006.01) | |
| *B60W 30/188* | (2012.01) | |

(52) U.S. Cl.
CPC ............... *B60W 20/10* (2013.01); *B60K 1/02* (2013.01); *B60L 15/2045* (2013.01); *B60W 10/06* (2013.01); *B60W 10/08* (2013.01); *B60W 30/188* (2013.01); *B60L 2240/423* (2013.01); *B60W 2520/10* (2013.01); *B60W 2710/0666* (2013.01); *B60Y 2200/91* (2013.01); *Y02T 10/64* (2013.01); *Y02T 10/72* (2013.01)

(58) Field of Classification Search
CPC .... B60W 20/10; B60W 10/08; B60W 30/188; B60K 1/02; B60L 15/2045
See application file for complete search history.

(56) References Cited

U.S. PATENT DOCUMENTS

| | | | |
|---|---|---|---|
| 8,355,833 B2* | 1/2013 | Koprubasi | B60L 15/2045 |
| | | | 701/22 |
| 9,132,736 B1* | 9/2015 | Shukla | B60W 10/08 |
| 2010/0106394 A1* | 4/2010 | Seufert | B60K 6/387 |
| | | | 701/113 |
| 2012/0081060 A1* | 4/2012 | Ishikawa | H02P 17/00 |
| | | | 318/491 |
| 2013/0211640 A1* | 8/2013 | Maier | B60W 10/06 |
| | | | 701/22 |

(Continued)

FOREIGN PATENT DOCUMENTS

| | | |
|---|---|---|
| CN | 103129410 A | 6/2013 |
| CN | 104175905 A | 12/2014 |

(Continued)

OTHER PUBLICATIONS

European Office Action dated Jan. 24, 2019, in connection with corresponding EP Application No. 17 197 204.5 (7 pgs., including machine-generated English translation).

(Continued)

*Primary Examiner* — Hunter B Lonsberry
*Assistant Examiner* — Elizabeth Yang
(74) *Attorney, Agent, or Firm* — Maier & Maier, PLLC

(57) ABSTRACT

A method for operating a drive system of a motor vehicle which is equipped with at least two E-machines, the drive system, as well as to a motor vehicle provided with the drive system.

6 Claims, 2 Drawing Sheets

(56) References Cited

U.S. PATENT DOCUMENTS

2014/0148309 A1* 5/2014 Yamazaki .............. B60W 10/11
477/109
2018/0312081 A1* 11/2018 Hancock ............. B60L 15/2063
2019/0283574 A1* 9/2019 Hummel ............. B60K 17/354

FOREIGN PATENT DOCUMENTS

| DE | 19932118 C1 | 10/2000 |
|----|----|----|
| DE | 102008054451 A1 | 6/2010 |
| DE | 102011119902 A1 | 6/2012 |
| DE | 102011013045 A1 | 9/2012 |
| EP | 2218603 A1 | 8/2010 |
| WO | 2012/097349 A2 | 7/2012 |

OTHER PUBLICATIONS

German Search Report dated Sep. 22, 2017 of corresponding German application No. 1020162233033; 7 pgs.
European Search Report dated Mar. 7, 2018 of corresponding European application No. 171972045; 6 pgs.
Office Action dated Jul. 31, 2020, in corresponding Chinese Application No. 201711182898.9, 15 pages.
Chinese Office Action dated Nov. 10, 2020, in connection with corresponding CN Application No. 201711182898.9 (7 pp., including machine-generated English translation).

\* cited by examiner

ENGINE CONTROL OF MOTOR VEHICLES WITH A PLURALITY OF E-MACHINES

FIELD

The invention relates to a method for operating a drive system of a motor vehicle which is provided with at least two E-machines equipped with the drive system, as well as to a motor vehicle provided with the drive system.

BACKGROUND

In the powertrain of current electrified vehicles there are often more than just one electric machine. This applies both to purely electrically powered motor vehicle, or so-called "battery electric vehicles (BEVs), as well as to hybrid vehicles, or so-called "plug-in hybrid electric vehicles (PHEVs), or so called "mild hybrid electric vehicles" (MHEVs). The electric machines are in this case often provided with different performance characteristics and they are as a rules arranged differently and also divided differently in the powertrain. So for example, a belt-driven starter generator (BSG) can be provided on a combustion engine, while further electric machines can be provided behind the drive, on the crankshaft, and/or on the rear axle (TSG, ISG). In the case of purely electrically operated motor vehicles, electric machines can be provided on the front axle and on the rear axle. The individual electric machines are often used in different operating ranges, which is to say with different torques and rotational speeds. In this case, each electric machine is as a rule operated separately and the entirety of the available machines is not considered. This can lead to a reduced efficiency of the drive. In the case of hybrid vehicles, this can lead to a higher fuel consumption and increased emissions of carbon dioxide. Also, the potential of the electric machines for the energy recovery and for power support ("boost") of the internal combustion engine is not fully utilized.

WO 2012/097349 A2 discloses a device and a method for power output distribution in a hybrid drivetrain of a hybrid motor vehicle. In a variant of the method, the distribution of the total driving power between an internal combustion engine and one or a plurality of electric engine of the hybrid vehicle is carried out while taking into account the energy costs incurred in the current mode.

From DE 10 2011 119 902 A is known a vehicle system in which multiple drive devices, including also an electric machine, are used to generate a torque with one crankshaft. A method for controlling the torque of an engine is proposed, wherein a desired total torque is distributed in the hybrid drivetrain between a plurality of drive units. The motor vehicle system selects in the idle mode the operating mode from a plurality of system modes in order to stabilize a net torque. Depending on the current efficiency of the conversion of additional fuel to electricity, the system can be switched between a charging mode and a discharging mode.

DE 10 2011 013 045 discloses a drive system and a method for controlling a drive system, wherein the drive control creates a desired overall torque from individual torques of different torque sources, which may be electric engines or internal combustion engines.

SUMMARY

The objective of this invention is to provide a method for operating a drive system of a motor vehicle that is provided with at least two E-engines and a corresponding drive system which has an improved energy efficiency.

The method according to the invention combines the operation of the respective electric machines in such a way with respect to the required total mechanical power of the vehicle, so that the power losses are minimized, or so that the efficiency level of the entirety of the electric machines is maximized.

In addition, a drive system for a motor vehicle is provided, which is operated with the method according to the invention. Embodiments will become evident from the description and from the accompanying figures. Furthermore, the invention relates to a motor vehicle provided with the drive system according to the invention.

The drive system according to the invention comprises at least two electric machines which are configured to apply the torque to one axle or to one wheel of the motor vehicle. The power output of the electric machines is controlled by means of at least one control unit. In one embodiment of the drive system, the control unit regulates the power output of the electric machines by controlling the rotational speed of each individual electric machine in the drive system.

The drive system in addition comprises at least one computing unit. In an embodiment of the invention, the computing unit is used to determine the power loss of the electric machines. In one embodiment, a power loss map is stored in the computing unit for each electric machine present in the drive system from which the power loss of the electric machine and additional losses of other components that are required for power transmission from the e-machines can be determined, such as electronic systems, drives, axles, etc., as a function of the rotational speed and of the torque of the electric machine. In another embodiment, the computing unit is used to determine the efficiency degree of the electric machines. In one embodiment, a characteristic curve is stored for this purpose for each available drive system in the computing unit, from which the efficiency degree of the electric machine can be determined as a function of the rotational speed and of the torque of the electric machine.

In one embodiment, the drive system according to the invention consists exclusively of electric machines. In one embodiment, the drive system comprises at least one electric machine, which is arranged on a transmission, or on a crankshaft, or on an axle. In another embodiment, the drive system comprises additionally at least one internal combustion engine, which means that the vehicle is therefore a hybrid vehicle, in one embodiment, the drive system of the hybrid vehicle comprises at least one belt-driven starter generator.

The invention also relates to a method to operate a drive system for a motor vehicle, which is equipped with at least two electric machines which are configured to apply a torque to an axle or to a wheel of the motor vehicle. The method comprises the following steps.

First, it is determined how large the total mechanical power output should be, which is applied by the entirety of the electric machines to the wheels or axles of the motor vehicle.

This can be for example a power output that is desired for supporting an acceleration, or an output that is available in the event of vehicle's deceleration carried out in order to recover energy with a generator operation.

In a second step, the determined mechanical power is distributed according to a possible embodiment to the individual electric machines in such a manner so that the sum of the power output losses of the electric machines is minimized. In one embodiment, the power loss of each electric machine is determined from a loss characteristic curve of the electric machine, stored in the drive system from the power loss of the electric machine, and from additional losses of other components that are required by the E-machines for power transmission, such as electronic systems, transmissions, axles, etc., which can be determined as a function of the rotational speed and of the torque of the electric machine.

In another embodiment, the determined mechanical power is distributed in the second step to individual electric machines in such a way that the efficiency of the entirety of the electric machines is maximized. In one embodiment, the efficiency of each electric machine is determined from a characteristic curve stored in a drive system, from which the efficiency of the electric machine can be determined as a function of the rotational speed and of the torque of the electric machine.

According to the determined power distribution, the electric machines of the drive system are then controlled in such a way so that the entirety of the electric machines provides the determined mechanical drive power. The power distribution is carried out in one embodiment by regulating the torque of the individual machines.

It goes without saying that the features mentioned above and those which are still to be explained below can be used not only in the respective combination indicated above, but also in other combinations, or in a single setting, without deviating from the scope of the present invention.

BRIEF DESCRIPTION OF THE FIGURES

The invention will be explained in more detail below based on an embodiment and with reference to the figures, which show the following.

DETAILED DESCRIPTION OF THE FIGURES

Figure 1:
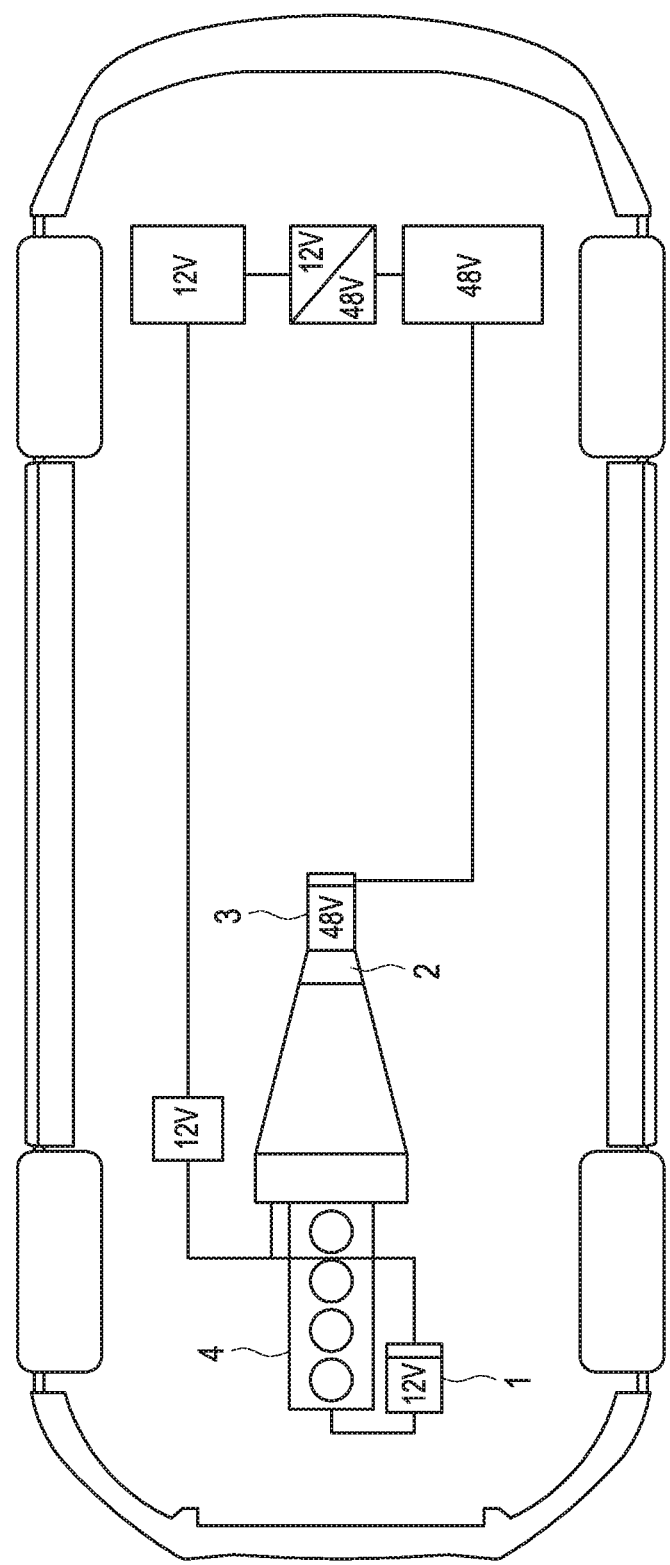
FIG. 1 shows a motor vehicle with an embodiment of the drive system according to the invention in a schematic representation.

The drive system schematically illustrated in FIG. 1 comprises two electric machines (E-machines): an electric machine 1, which is designed as a belt-driven starter generator (BSG) and arranged on an internal combustion engine 4, and a second electric machine 3, which is arranged behind a transmission 2 (TSG). Not shown in the figure are the control units for the electric machines, and the computing unit which determines the distribution between the two electric machines 1 and 3. In this example is illustrated a combination of on-board vehicle electric systems with 12 V and 48 V. However, the drive system according to the invention is not limited to certain on-board power supply voltages. It is possible to use for example an on-board electric system with 48 V, or an HV electric system can be also used.

Figure 2:
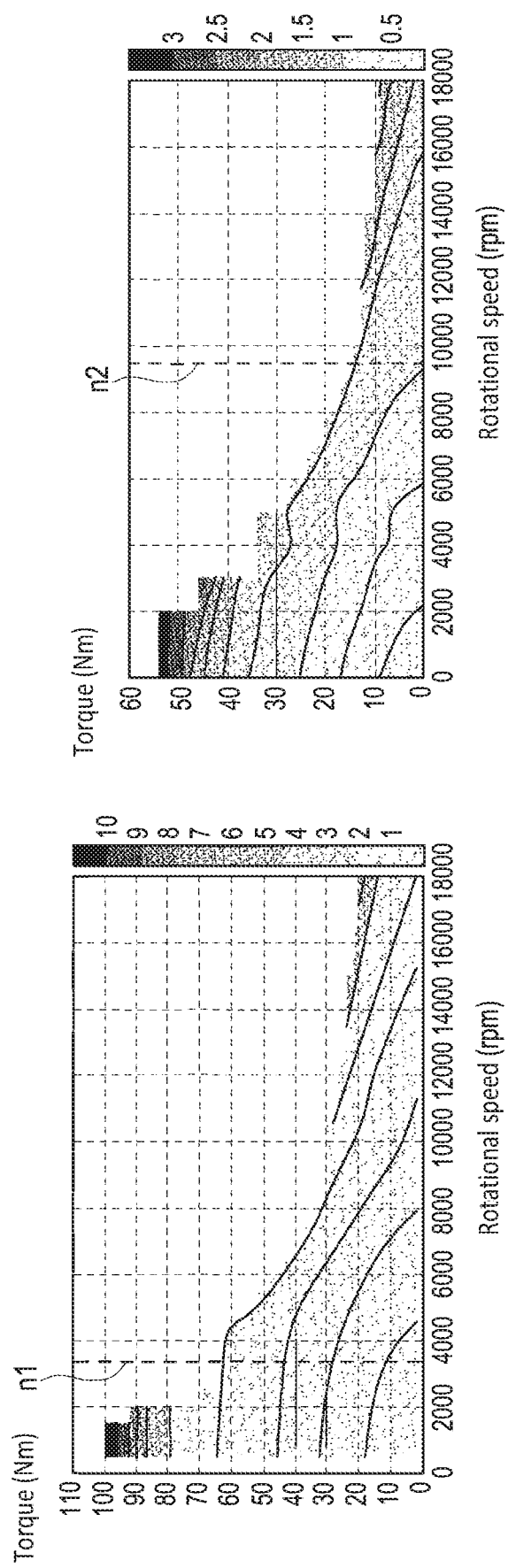
FIG. 2 shows characteristic curves obtained with the machines of FIG. 1.

For a predetermined total power, the respective power loss is determined from the characteristic curves illustrated in FIG. 2 for predetermined torques M (vertical axis) with different rotational speeds n (horizontal axis). FIG. 2 illustrates on the left the characteristic curve of the first electric machine. The dotted line corresponds to a rotational speed n1 of the first electric machine 1. On the right side of the diagram in FIG. 2 is illustrated the second electric machine 3. The dotted line corresponds to a rotational speed n2 of the second electric machine 3.

The torques are selected by means of a search function in such a way that the sum of the power output of the two electric machines 1 and 3 corresponds to the predetermined power output and in addition, the sum of the power losses of the two electric machines 1 and 3 will be minimized.

It is therefore valid that $P=(M1*n1+M2*n2)$ and $P_{vtot}=P_{V\_1}+P_{V\_2}$, wherein P is the total output of both electric machines, M1 is the torque of the first electric machine 1, M2 is the torque of the second electric machine 3, $P_{vtot}$ is the total power loss of both electric machines, which includes also additional losses of other components that are required by the electric machines such as electronic systems, transmissions, axles, etc., resulting in the sum of power losses $P_{V\_1}$ and $P_{V\_2}$ of the first and the second electric machine.

During the driving operation, the method according to the invention combines the operation of the two machines in such a way that the required total power of the motor vehicle is divided between the two electric machines. As a result, the total losses are minimized with the selection of the optimal operating points (in the range of better efficiency) of both electric machines. Therefore, the best efficiency is achieved or the total power loss is minimized with the combination in the drivetrain. This results in an increased efficiency of the drivetrain, while the $CO_2$ emissions are reduced and the potential of the E-machines for recuperation and boost is optimally exhausted.

The invention claimed is:

1. A drive system for a motor vehicle, comprising:
   at least two electric machines, which are configured to each simultaneously apply a driving torque to an axle or a wheel of the motor vehicle;
   at least one control unit for controlling the power output of the electric machines; and
   at least one computing unit for determining the power loss or the efficiency of the electric machines,
   wherein a loss characteristic curve is stored in the computing unit for each electric machine that is present in the drive system, from which the power loss of the electric machines can be determined by the computing unit as a function of the rotational speed and of the torque of the electric machine,
   wherein an additional loss characteristic is stored in the computing unit which predicts additional mechanical losses incurred by at least one of an axle or a transmission as a function of the rotational speed and of the torque of the electric machine,
   wherein the torque generated by the at least two electric machines on the axle or wheel is distributed between each of the at least two electric machines based on (1) each of the loss characteristic curves stored by the computing unit for each electric machine and (2) the additional loss characteristic so that a sum of the power output of the at least two electric machines corresponds to a predetermined power output and a sum total of power losses between the at least two electric machines is minimized.

2. The drive system according to claim 1, wherein at least one electric machine arranged on a transmission, on a crankshaft, or on an axle.

3. The drive system according to claim 1, which further comprises:
   at least one internal combustion engine.

4. The drive system according to claim 3, which further comprises:
one belt-driven starter generator.

5. The drive system according to claim 1, wherein a characteristic curve is stored in the computing unit for each electric machine that is present in the drive system, from which the efficiency of the electric machines can be determined as a function of the rotational speed and of the torque of the electric machine.

6. The drive system according to claim 1, wherein the control over the power output of the electric machines is carried out by regulating the torques of the electric machines.

* * * * *